(12) United States Patent
Legler et al.

(10) Patent No.: US 10,013,442 B2
(45) Date of Patent: Jul. 3, 2018

(54) DATABASE VALUE IDENTIFIER HASH MAP

(71) Applicant: SAP SE, Walldorf (DE)

(72) Inventors: Thomas Legler, Walldorf (DE); Peter Steinemann, Mannheim (DE)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 14/748,036

(22) Filed: Jun. 23, 2015

(65) Prior Publication Data

US 2016/0378750 A1 Dec. 29, 2016

(51) Int. Cl.
*G06F 17/30* (2006.01)

(52) U.S. Cl.
CPC .................. *G06F 17/3033* (2013.01)

(58) Field of Classification Search
CPC . G06F 17/3033; G06F 17/30; G06F 17/30424
USPC ................................................. 707/600–899
See application file for complete search history.

(56) References Cited

U.S. PATENT DOCUMENTS

2015/0324480 A1* 11/2015 Schreter ............ G06F 17/30952
707/741

* cited by examiner

*Primary Examiner* — Isaac M Woo
(74) *Attorney, Agent, or Firm* — Mintz Levin Cohn Ferris Glovsky and Popeo, P.C.

(57) ABSTRACT

The subject matter disclosed herein provides methods for inserting and retrieving value identifiers from a dictionary encoded database using hash maps. A first value identifier and a first value can be accessed from a dictionary storing one or more value identifiers and one or more values. Each value identifier can correspond to a different value. The hash map and the first value can be used to determine a first index in a bucket list for inserting the first value identifier. The bucket list can have one or more indices. Each index can store at least one value identifier. The hash map can include a vector of one or more pointers. Each pointer can refer to at least one of the indices. Based on the determining, the first value identifier can be inserted at the first index without inserting the first value. Related apparatus, systems, techniques, and articles are also described.

20 Claims, 9 Drawing Sheets

800

- ACCESS A FIRST VALUE IDENTIFIER AND A FIRST VALUE FROM A DICTIONARY — 810
- DETERMINE, USING AT LEAST A HASH MAP AND THE FIRST VALUE, A FIRST INDEX IN A BUCKET LIST FOR INSERTING THE FIRST VALUE IDENTIFIER — 820
- INSERT THE FIRST VALUE IDENTIFIER AT THE FIRST INDEX WITHOUT INSERTING THE FIRST VALUE — 830

DATABASE VALUE IDENTIFIER HASH MAP

TECHNICAL FIELD

This disclosure relates generally to hash maps and, more particularly, to inserting and retrieving value identifiers from a dictionary encoded database using hash maps.

BACKGROUND

Database systems are configured to perform a variety of operations on a large number of data records. These data records can be organized using different mechanisms including, for example, dictionary indexing. In order to process a query involving a particular data record, conventional database systems may traverse the entire dictionary until the desired data record is found. This retrieval process can be time consuming, especially as the number of data records in the dictionary grows. Faster mechanisms for storing and retrieving data records in database systems are needed. While some conventional database systems use hash maps to alleviate this problem, information stored in these hash maps that can be memory intensive.

SUMMARY

Methods and apparatus, including computer program products, are provided for inserting and retrieving value identifiers from a dictionary encoded database using hash maps.

In one aspect, a first value identifier and a first value are accessed from a dictionary. The dictionary stores one or more value identifiers and one or more values. The one or more value identifiers and the one or more values represent data managed by a database system. Each value identifier corresponds to a different value. Using at least a hash map and the first value, a first index in a bucket list is determined for inserting the first value identifier. The bucket list has one or more indices. Each index of the bucket list stores at least one of the one or more value identifiers. The hash map is based on a data type of the one or more values and includes a vector of one or more pointers. Each pointer refers to at least one of the one or more indices of the bucket list. Based on the determining, the first value identifier is inserted at the first index without inserting the first value. The inserting at the first index provides direct memory access to the first value identifier without any intervening memory hops.

The above methods, apparatus, and computer program products may, in some implementations, further include one or more of the following features.

Each index can store a maximum of two value identifiers.

A second value identifier and a second value can be accessed from the dictionary. The second value identifier can be inserted at the first index without the second value when a first collision occurs. The first collision can occur when the hash map maps the first value and the second value to the first index.

The first value identifier and the second value identifier can be inserted at the first index without using a linked list.

A third value identifier and a third value can be accessed from the dictionary. The third value identifier can be inserted in a bucket without the third value when a second collision occurs. The first value identifier and the second value identifier can be moved from the first index in the bucket list to the bucket when the second collision occurs. A pointer value can be inserted in the first index. The pointer value can refer to the bucket. The second collision can occur when the hash map maps the first value, the second value, and the third value to the first index.

Each index of the bucket list can further include encoding representative of whether the index comprises one or more value identifiers or a pointer value.

The bucket can further store a first size of the first value next to the first value identifier, a second size of the second value next to the second value identifier, and a third size of the third value next to the third value identifier.

Each index can store a maximum of 1 value identifier.

A second value identifier and a second value can be accessed from the dictionary.

The second value identifier can be inserted in a bucket without the second value when a collision occurs. The first value identifier can be moved from the first index to the bucket when the collision occurs. An offset position can be inserted in the first index. The offset position can be associated with a first pointer value in an overflow list having one or more pointer values. The first pointer value can refer to the bucket. The collision can occur when the hash map maps the first value and the second value to the first index.

Each index of the bucket list can further include encoding representative of whether the index comprises a value identifier or an offset value.

In another aspect, a query for a first value identifier is received. The query includes a first value corresponding to the first value identifier. The first value and the first value identifier are stored in a dictionary having one or more value identifiers and one or more values. The one or more value identifiers and the one or more values represent data managed by a database system. Using at least a hash map and the first value, a first index in a bucket list is determined for retrieving the first value identifier. The bucket list has one or more indices. Each index of the bucket list stores at least one of the one or more value identifiers without any corresponding value. The hash map is based on a data type of the one or more values and includes a vector of one or more pointers. Each pointer refers to at least one of the one or more indices of the bucket list. The first value identifier is retrieved from the first index.

The above methods, apparatus, and computer program products may, in some implementations, further include one or more of the following features.

A lookup operation can be performed in the dictionary by at least finding the first identifier value and a corresponding value in the dictionary and comparing the corresponding value to the first value in the query. The first value identifier can be retrieved from the first index when the corresponding value matches the first value.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, in some implementations, value identifiers can be stored directly in a bucket list without any corresponding values. Saving only the value identifiers in the bucket list can reduce the consumption of memory resources and can prevent expensive memory allocations. Moreover, because value identifiers are stored directly in the bucket list, a search structure can access these value identifiers directly without any intervening memory hops. The subject matter described herein also provides collision resolution techniques that allow any number of value identifiers of any size to be stored using a dual memory structure configuration.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

Figure 1:
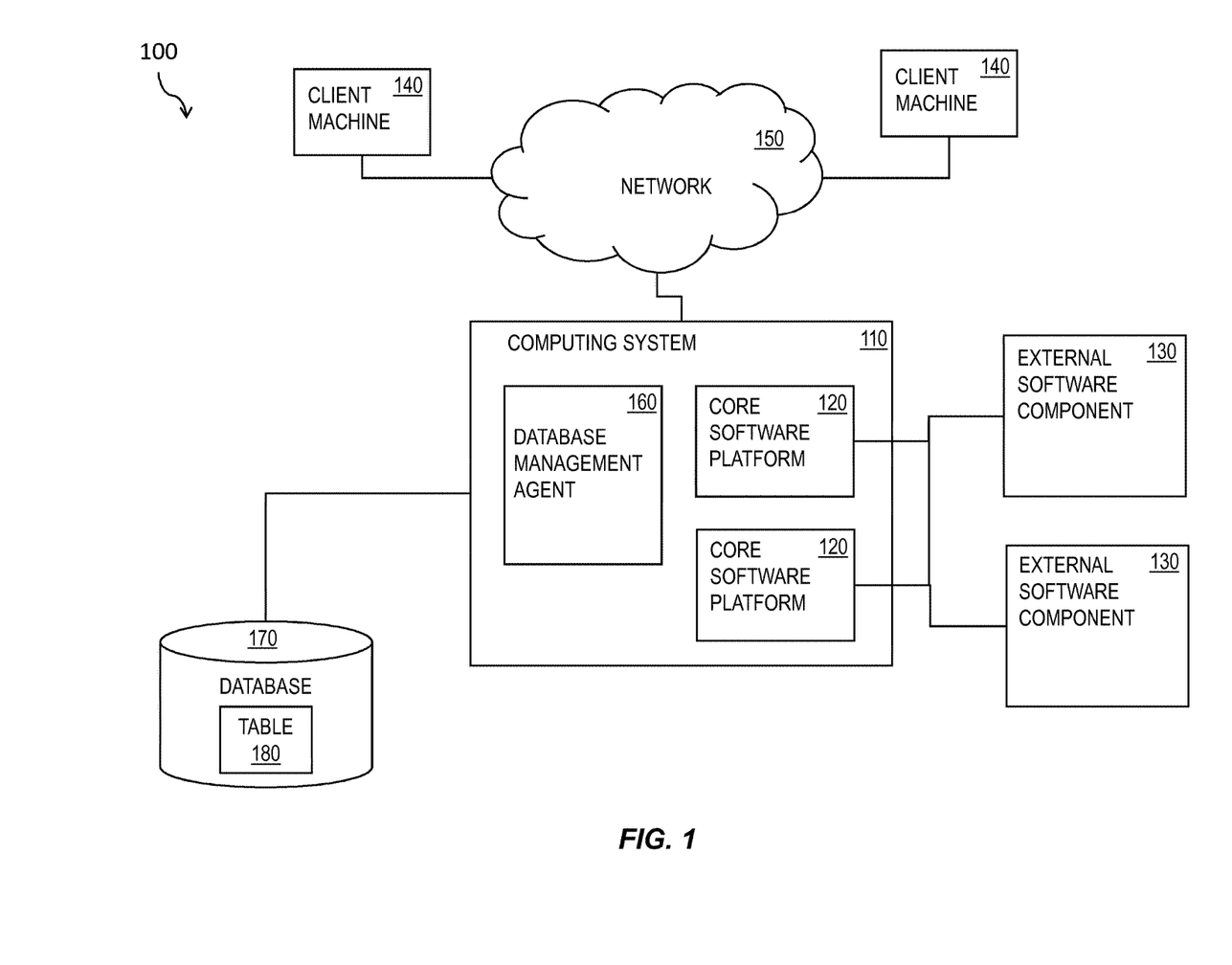
FIG. 1 is a diagram illustrating features of a business software system architecture.

FIG. 1 shows a diagram 100 of a computing system 110 that can perform the techniques disclosed herein. Computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, and the like that relate to definitions of the business scenarios, business processes, and one or more business configurations, and/or concrete instances of data objects and/or business objects that are relevant to a specific instance of a business scenario or a business process, and the like. The database management system 170 can include at least one table 180.

Figure 2:
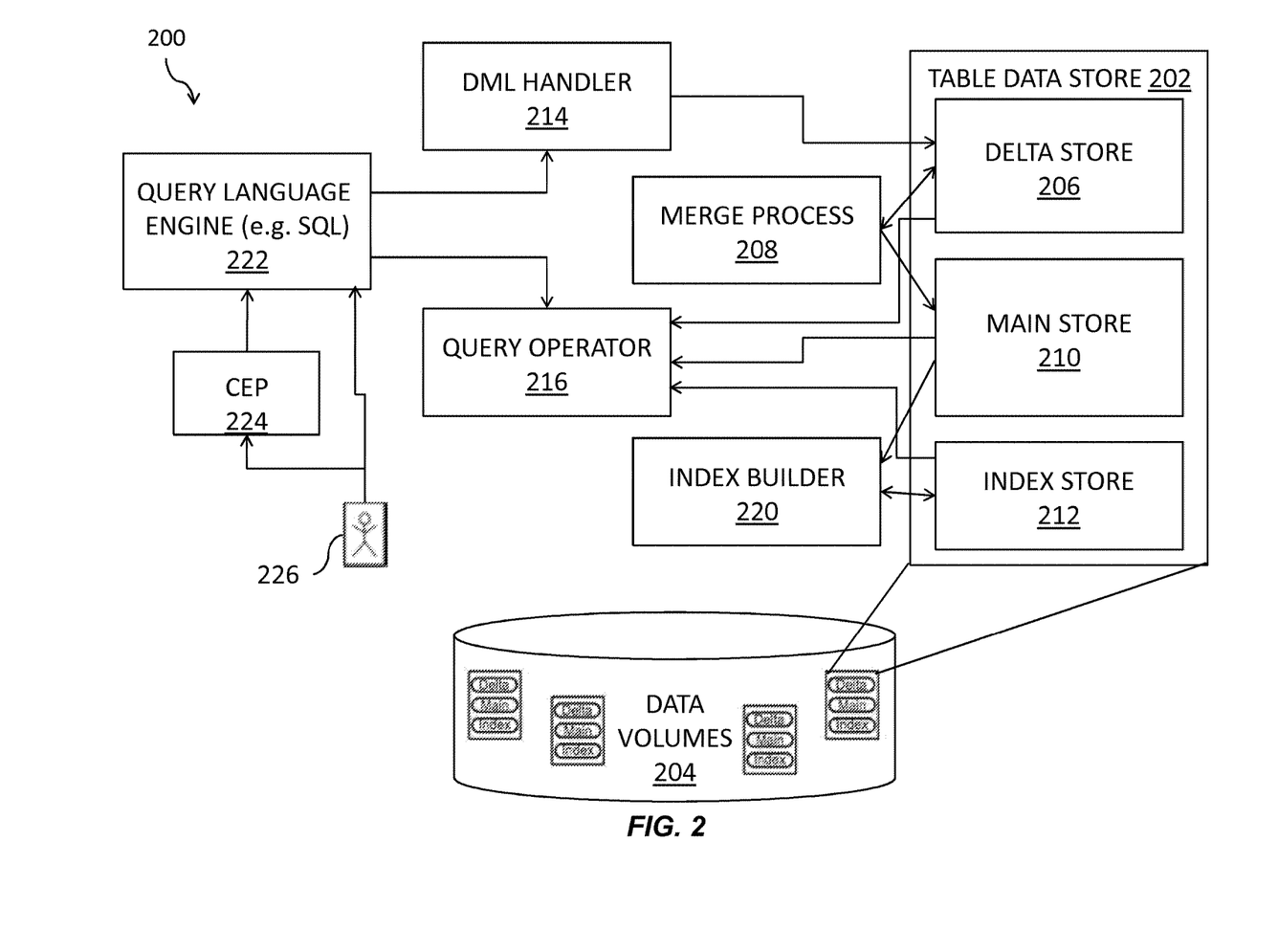
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented. In some implementations, the data stored in table data store 202, delta store 206, and main store 210 can be organized in columns, for example. Generally, a column store can be optimized for high performance of read operations while providing good performance for write operations. Moreover, organizing data in columns can provide efficient data compression. Delta store 206 can contain a delta container for every column, for example. Data can be stored in delta store 206 first before moving or merging the data into main store 210. Architecture 200 can also include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 3:
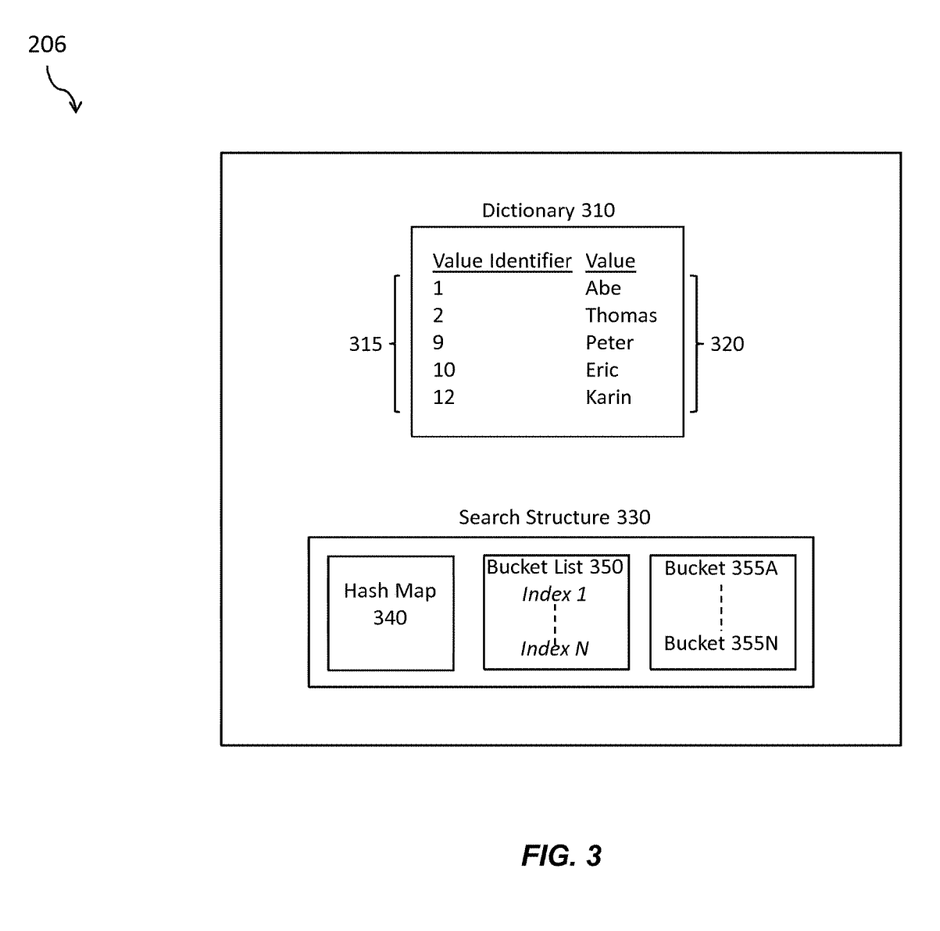
FIG. 3 is a diagram illustrating features of a delta store container.

FIG. 3 shows an expanded block diagram of delta store 206. In the implementations described herein, delta store 206 is referred to as a column delta store, although other types of delta stores can be used. Delta store 206 can include a dictionary 310 that stores one or more values 315 and one or more corresponding value identifiers 320. Values 315 and value identifiers 320 can include data managed by the database management system 170. Values 315 can include any combination of integers, strings, and the like. Value identifiers 310 can represent the position of a corresponding value in dictionary 310 (e.g., an integer). In the implementation of FIG. 3, the value "Abe" can have a value identifier of "1", which indicates that "Abe" is the first value in dictionary 310.

Delta store 206 can also include a search structure 330 that is configured to search the value identifiers and values. Query operator 216 can use search structure 330 to quickly find a value identifier for a given value. This capability can be useful when query operator 216 receives a request to perform an operation involving one or more values. For example, if query operator 216 receives a request to concatenate values "Abe" and "Thomas", search structure 330 can perform the requested concatenation using corresponding value identifiers "1" and "2", respectively. Because dictionary 310 may include hundreds of thousands of values, it may be too time consuming to inspect each value in the dictionary until the desired value and its corresponding value identifier are found. In order to hasten this process, search structure 330 can use hash map 340 to quickly find the desired value and its corresponding value identifier.

Hash map 340 is a data structure that can map a value to a value identifier. In some implementations, hash map 340 can be a vector of one or more pointers. Each pointer can have a value that points to an index in bucket list 350. Hash map 340 can use a hash function to compute the index at which a new value identifier can be inserted or an existing value identifier can be found. Different hash functions can be used including, for example, a mod hash function, a hash function for strings, and the like. The type of hash function that is used can depend on the type of data stored at values 315. Search structure 330 can use hash map 340 to determine where to insert and/or retrieve a value identifier given a desired input value. As explained below with respect to FIGS. 4-7, value identifiers 320 can be inserted at or retrieved from any of the indices in bucket list 350 or buckets 355A to 355N.

Figure 4:
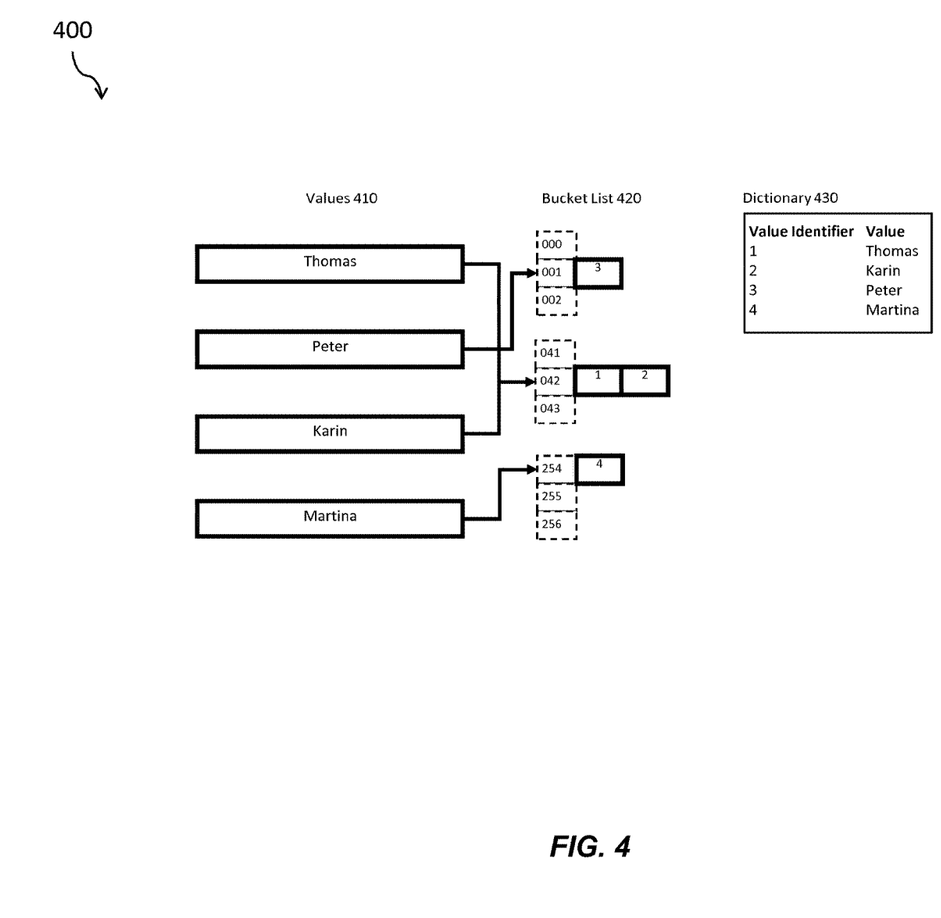
FIG. 4 is a schematic representation for inserting and retrieving value identifiers using a hash map, a bucket list, and a dictionary.

FIG. 4 illustrates a schematic representation 400 for inserting and retrieving value identifiers using a hash map. Values 410 can represent various input values. Search structure 330 can insert and retrieve any of the value identifiers corresponding to values 410 using hash map 340. For example, when "Peter" is added as a new value into dictionary 430, search structure 330 can use hash map 340 to determine where the corresponding value identifier (i.e., "3") should be inserted. In another example, if query operator 216 receives a request to retrieve the value "Martina" for an operation, then search structure 330 can enter this input value into hash map 340 to determine the location from which the corresponding value identifier (i.e., "4") can be found.

Bucket list 420 can include indices 000, 001, 002, 041, 042, 043, 254, 255, and 256. Each index can store a null value (i.e., 0 value identifiers) or one or more value identifiers. Unlike conventional hash maps which store both values and value identifiers in a bucket list, bucket list 420 can only store value identifiers. Eliminating values from bucket list 420 can reduce the amount of memory resources used by search structure 330. If a particular value is needed, search structure 330 can simply perform a lookup operation in dictionary 430 to obtain the desired value. Moreover, the implementation of FIG. 4 requires less dynamic memory allocation than conventional hash maps because only value identifiers are stored. Whereas value identifiers have a fixed size (e.g., 4 bytes), values can have varying sizes (e.g., the value "Martina" has more characters and, consequently, consumes more memory than the value "Karin").

Continuing with the above examples, if "Peter" is added to dictionary 430, then search structure 330 can use hash map 340 to determine the index at which the corresponding value identifier (i.e., "3") should be stored. Entering the value "Peter" into hash map 340 can yield index "001", and search structure 330 can insert value identifier "3" at this index. Likewise, entering the value "Martina" into hash map 340 can yield an index "254", and search structure 330 can retrieve value identifier "4" from this index.

In some instances, a collision can occur when hash map 340 maps two values to the same index. In schematic representation 400, for example, hash map 340 can map the values "Thomas" and "Karin" to index "042" in bucket list 420. When a collision occurs, search index 330 can insert the affected value identifiers (i.e., "1" and "2") at the same index. Unlike conventional hash maps which may store these value identifiers using a linked list data structure, search index 330 may not use a linked list. In a linked list, each node of the list can be stored in disparate locations throughout memory. For example, in a linked list, value identifiers "1" and "2" can be stored at noncontiguous memory addresses. Because these value identifiers may not be located near each other, traversing the linked list to retrieve a desired value identifier can be time consuming, especially when the linked list has many nodes. In order to avoid this deficiency, search index 330 can insert value identifiers "1" and "2" in contiguous memory addresses. Using contiguous memory addresses in bucket list 420 can provide direct access to value identifiers without any intervening memory hopping.

Schematic representation 400 also illustrates a process for retrieving a value identifier from colliding values. Query operator 216 can receive a request to retrieve the value identifier corresponding to the value "Karin". In order to process this request, search structure 330 can enter this value into hash map 340 which, in turn, can return index "042". Index "042", however, may have two value identifiers "1" and "2", as described above. In order to determine which value identifier corresponds to the input value "Karin," search structure 330 can perform a lookup operation in dictionary 430 for each value identifier. In doing so, search structure 330 can determine that the value identifier "1" corresponds to the value "Thomas". Because this value ("Thomas") does not match the input value ("Karin"), search structure 330 can eliminate this value identifier ("1") from consideration and move on to the next value identifier ("2") in the adjacent memory address. Again, search structure 330 can refer to dictionary 430 to determine the value associated with value identifier "2". Because this value ("Karin") matches the input value, search structure 330 can terminate its search because it has found the correct value identifier ("2"). In this example, a dictionary lookup operation is performed because a collision exists at index "042". The presence of a collision, however, is not a prerequisite for performing a dictionary lookup operation. In some implementations, search structure 330 can perform a dictionary lookup operation whether or not a collision is present. Doing so can be helpful if, for example, query operator 216 attempts to retrieve a value identifier that has not yet been added to dictionary 430.

Figure 5A:
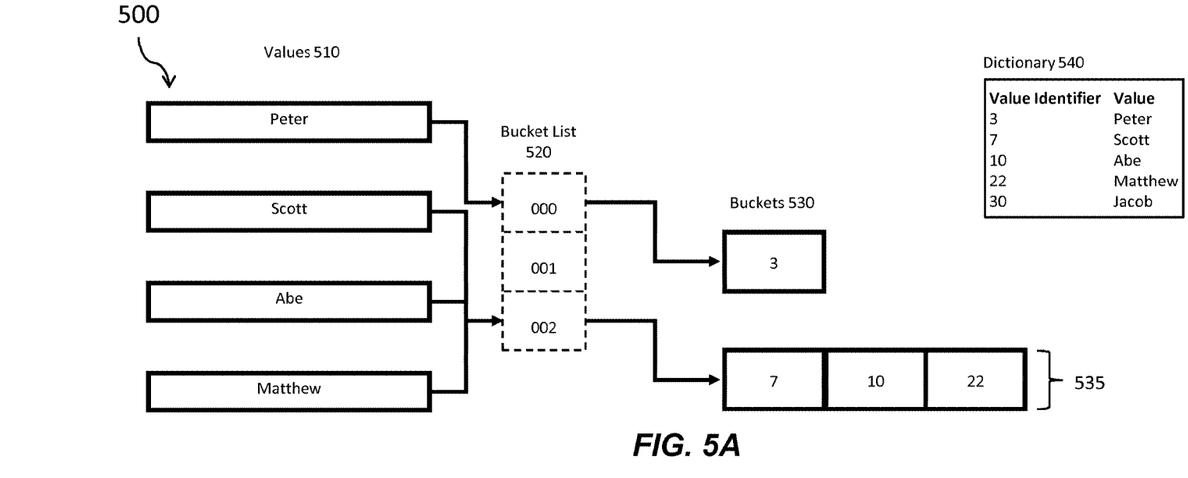
FIG. 5A is a schematic representation for inserting and retrieving value identifiers using a hash map, a bucket list, buckets, and a dictionary.

FIG. 5A illustrates another schematic representation 500 for inserting and retrieving value identifiers using a hash map and a dictionary. Dictionary 540 can stores various value identifier and value pairs. Schematic representation 500 can be a variation of schematic representation 400. As described above with respect to FIG. 4, value identifiers can be stored in bucket list 420. In the implementation of FIG. 5A, however, pointers can be stored in bucket list 520, and the value identifiers can be moved to buckets 530.

Replacing value identifiers with pointers in the bucket list can provide a valuable performance advantage. Generally, each index in a bucket list has a fixed size. This fixed size can limit the quantity of value identifiers that can be stored at the index. In the implementations described herein, each index can have a fixed size of 8 bytes, and each value identifier can have a fixed size of 4 bytes, for example. In light of these size constraints, each index in a bucket list can store a maximum of two value identifiers.

This arrangement can be problematic, however, if a collision occurs between three or more different values 510. When this occurs, hash map 340 can map each of these values to the same index. In the implementation of FIG. 5A, for example, the values "Scott", "Abe", and "Matthew" can each map to index "002" in bucket list 520. Search structure 330, however, cannot insert corresponding value identifiers "7", "10", and "22", respectively, in index "002" because they occupy more space (i.e., 12 bytes=4 bytes/value identifier*3 value identifiers) than the index can hold (i.e., 8 bytes). In order to alleviate this situation, search structure 330 can, instead, store a pointer in each of the indices of bucket list 520. Each pointer can have a fixed size (e.g., 8 bytes). Each pointer can also have a value that points to or refers to one of buckets 530.

Buckets 530 can be memory structures of varying sizes that can store value identifiers. In the implementation of FIG. 5A, for example, the pointer in index "002" can point to bucket 535 which, in turn, can store value identifiers "7", "10", and "22". Search structure 330 can rewrite a bucket when an insert operation is performed. If, for example, a new value "Jacob" is added to dictionary 540, search structure 330 can insert the corresponding value identifier into one of buckets 530. If hash map 340 maps the value "Jacob" to index "002" (i.e., a collision exists between the values "Scott", "Abe", "Matthew", and "Jacob"), search structure 330 can rewrite bucket 535 if, for example, the bucket is not large enough to store all four corresponding value identifiers. In doing so, search structure 330 can create a new bucket; insert value identifier "30" into this new bucket; move identifiers "7", "10", and "22" from old bucket 535 to the new bucket; update the pointer value at index "002" to point to the new bucket; and delete the old bucket 535.

In some implementations, search structure 330 can save miscellaneous information regarding each value, such as its size. This information can be inserted alongside the corresponding value identifiers in buckets 530. Saving size information can hasten retrieval operations.

Figure 5B:
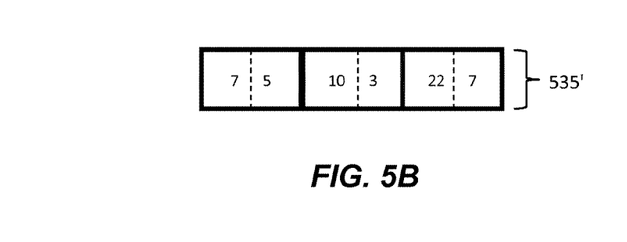
FIG. 5B is a diagram of a bucket.

For example, in the implementation of FIG. 5B, bucket 535' can store value identifiers "7", "10", and "22", which can correspond to values "Scott", "Abe", and "Matthew", respectively. Search structure 330 can also save the size of each value (i.e., the number of characters in each value) next to the corresponding value identifier. This size can represent, for example, the number of characters in each value. Search structure 330 can insert sizes "5" (i.e., 5 characters in the string value "Scott"), "3" (i.e., 3 characters in the string value "Abe"), and "7" (i.e., 7 characters in the string value "Matthew") next to corresponding value identifiers "7" (i.e., corresponding to "Scott"), "10" (corresponding to "Abe"), and "22" (corresponding to "Matthew"), respectively.

Search structure 330 can use size information to hasten the retrieval process. For example, if search structure 330 receives a request to retrieve the value identifier for "Abe", it can inspect each value identifier and its corresponding size in bucket 535'. The first pair of entries in bucket 535' can have a value identifier of "7" and a size of "5". Because the input value "Abe" only has three characters (i.e., has a value size of "3"), search structure 330 can eliminate this first pair from consideration because its size (i.e., "5") does not match. There is no need for search structure 330 to perform a lookup operation in dictionary 540 to determine whether the value for value identifier "7" matches the input value "Abe". Rather, search structure 330 can skip the dictionary lookup operation altogether.

Search structure 330 can then move on to the second pair of entries, which can have a value identifier of "10" and a size of "3". Because this value's size (i.e., "3") matches the number of characters in input value "Abe", search structure 330 can deduce that the value identifier in this second pair (i.e., "10") is likely correct. In order to confirm that value identifier "10" corresponds to input value "Abe", search structure 330 can refer to dictionary 540.

As described above with respect to FIG. 5A, using different memory structures (i.e., a bucket list and buckets) to store pointers and value identifiers allows search structure 330 to accommodate collisions of 3 or more values. Because search structure 330 can rewrite buckets 530 when new value identifiers are inserted, value identifiers of varying sizes can be used. However, direct access to value identifiers may not be possible in the implementation of FIG. 5A because value identifiers are stored one memory hop away at buckets 530 instead of being stored directly within bucket list 520.

Figure 6:
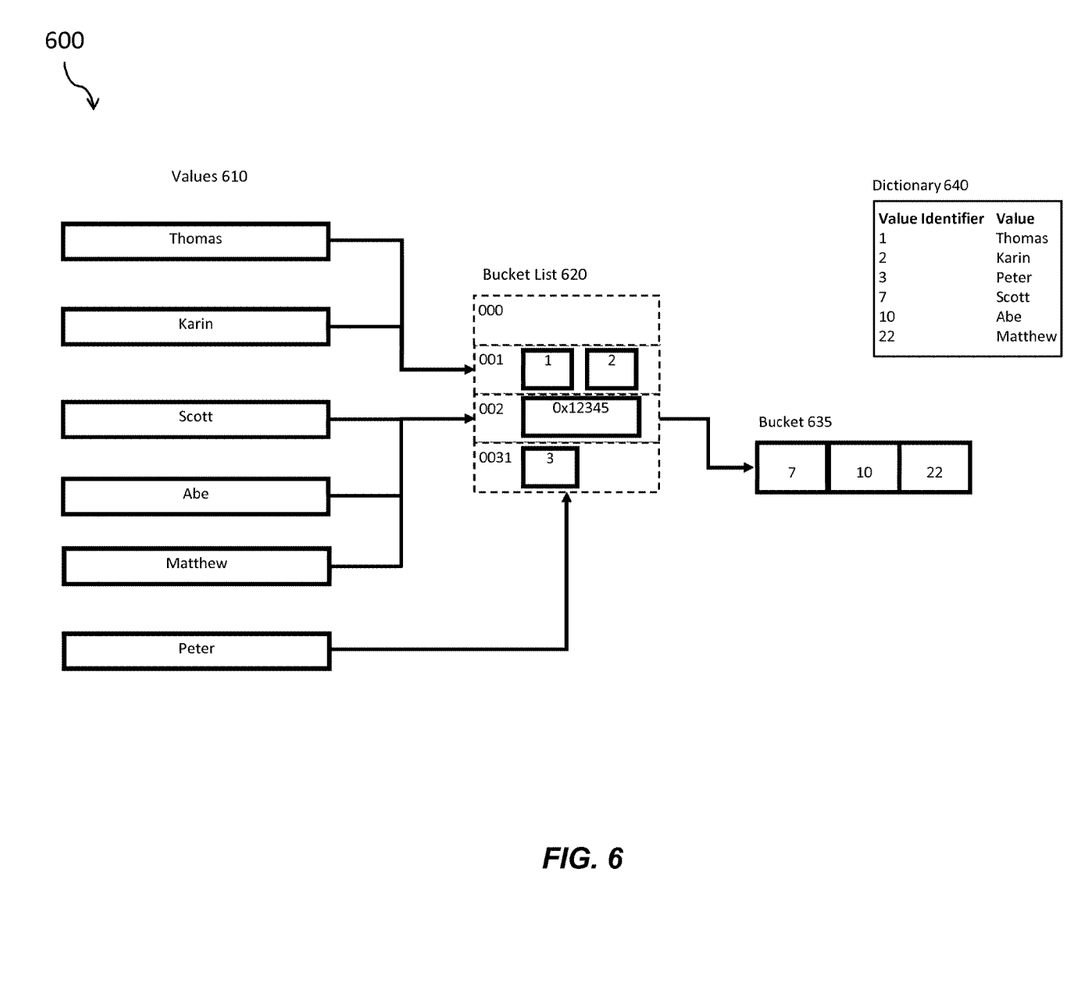
FIG. 6 is another schematic representation for inserting and retrieving value identifiers using a hash map, a bucket list, buckets, and a dictionary

FIG. 6 is yet another schematic representation 600 for inserting and retrieving value identifiers using a hash map. Schematic representation 600 can be a hybrid of schematic representations 400 and 500 and, consequently, can store both value identifiers and pointers using a bucket list and buckets. This hybrid representation can provide direct memory access for up to two value identifiers and the ability to store additional value identifiers (i.e., 3 or more value identifiers) one memory hop away. Schematic representation 600 can include a dictionary 640 of value and value identifier pairs. Hash map 340 can map values 610 to indices in bucket list 620.

As illustrated in FIG. 6, each index can store either a null value (e.g., index "000"), one value identifier (e.g., index "0031"), two value identifiers (e.g., "index "001"), or a pointer (index "002"). The maximum number of value identifiers that can be stored in an index (such as in indices "0031" and "001") can depend on the size of each index and value identifier. If, for example, each value identifier is half the size (e.g., 4 bytes) of a bucket list index (e.g., 8 bytes), then each index can store a maximum of two value identifiers. As such, if a collision occurs between two values (e.g., between values "Thomas" and "Karin"), then their corresponding value identifiers (i.e., "1" and "2") can be inserted directly into bucket list 620 (i.e., at index "001"), as described above with respect to FIG. 4.

If, however, a collision occurs between three or more values, then search structure 330 can utilize the dual bucket list-bucket configuration described above with respect to FIG. 5A. For example, hash map 340 can map values "Scott", "Abe," and "Matthew" to index "002" in bucket list 620, which can result in a collision. Because the three value identifiers associated with these values may not fit in index "002", search structure 330 can insert the value identifiers (i.e., "7", "10", and "22") in a bucket (i.e., bucket 635) and insert a pointer to this bucket at the source index (i.e., index "002").

Search structure 330 can incorporate special encoding into bucket list 620 to distinguish between indices that store pointers versus indices that store value identifiers. This special encoding may be stored as a Boolean value in a reserved bit at each index of bucket list 620, for example. During a retrieval operation, search structure 330 can check this bit value to determine whether it can simply read the desire value identifier directly from the bucket list or whether it needs to follow a pointer to a bucket to retrieve the value identifier.

Figure 7:
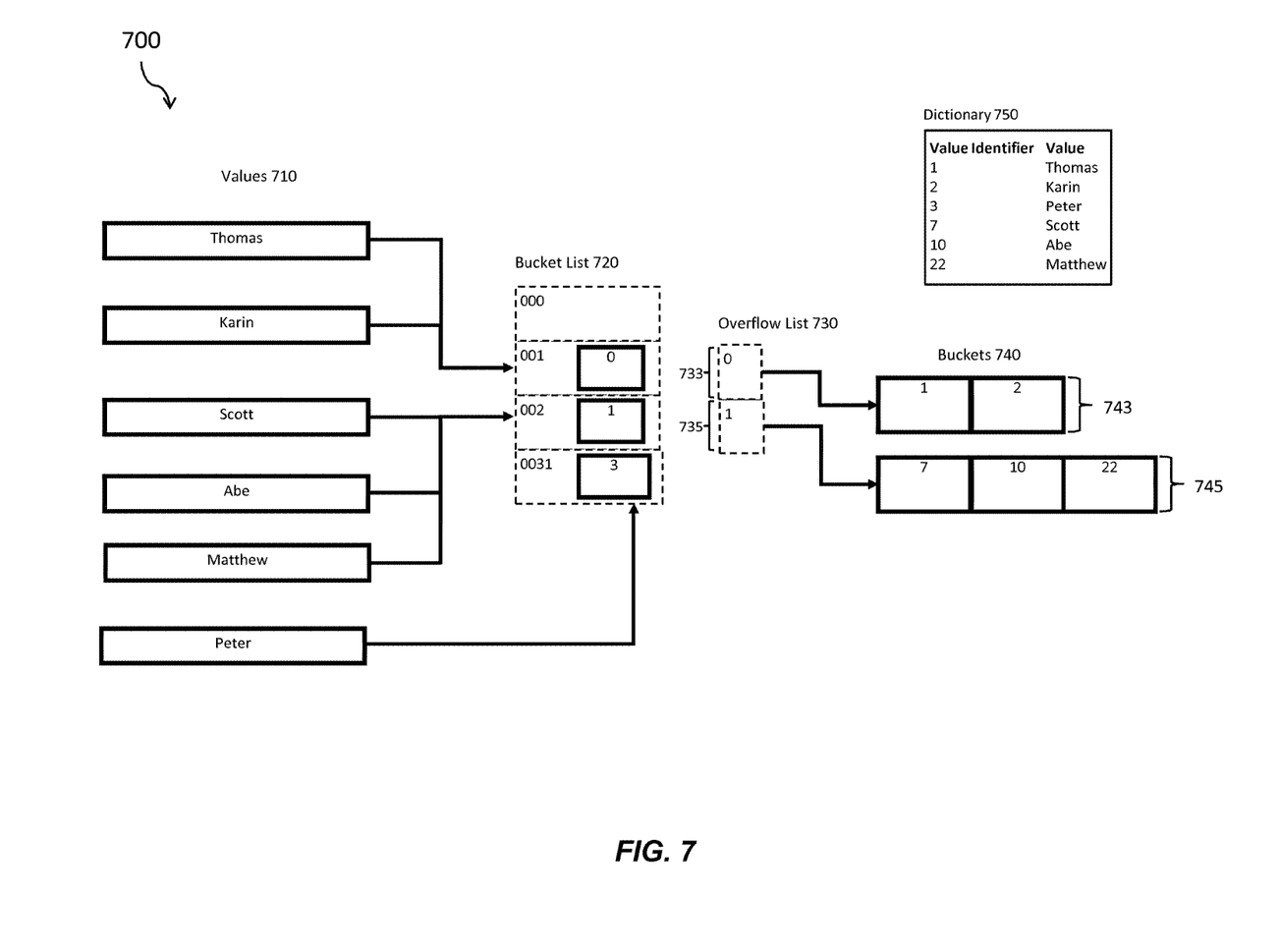
FIG. 7 is a schematic representation for inserting and retrieving value identifiers using a hash map, a bucket list, an overflow list, buckets, and a dictionary.

FIG. 7 illustrates another schematic representation 700 for inserting and retrieving value identifiers using a hash map. Schematic representation 700 can include a dictionary 750 of value and value identifier pairs. Hash map 340 can map values 710 to indices in bucket list 720. Schematic representation 700 is similar to schematic representation 600 but may impose a smaller size constraint on the indices in the bucket list. For example, each index in bucket list 720 can be half the size (e.g., 4 bytes) of each index in bucket list 620 (e.g., 8 bytes). Reducing the total memory footprint of the bucket list can reduce the consumption of memory resources.

Decreasing the index size in bucket list 720 can affect the type of data that can be stored in the bucket list. In schematic representation 700, each index in bucket list 720 can store either a null value (e.g., index "000"), a single value identifier (e.g., index "0031"), or an offset value (e.g., indices "001" and "002"). Because each value identifier can be 4 bytes large, only one value identifier at most can be inserted in each index (e.g., index "0031"). When a collision occurs between two or more values, search structure 330 can insert an offset value in the corresponding index ("e.g., indices "001" and "002"). An offset value can be sized to fit within an index. A pointer cannot be used as described above with respect to FIGS. 5 and 6, because a pointer, which is generally 8 bytes large, cannot fit into the reduced index size.

In the implementation of FIG. 7, collisions can occur at indices "001" (i.e., between values "Thomas" and "Karin") and "002" (i.e., between values "Scott", "Abe", and "Matthew"). Indices "001" and "002" can store offset values "0" and "1", respectively, to indicate the presence of these collisions. These offset values can be associated with overflow list 730. Overflow list 730 can be a metadata structure within search structure 330 that stores a list of every bucket 740 in hash map 340. Overflow list 730 can include one or more pointers, and each pointer can have a value that points or refers to at least one of buckets 740. Search structure 330 can follow the chain of offset values, pointers, and buckets to determine where a new value identifier should be inserted and/or where to retrieve an existing value identifier.

As illustrated in FIG. 7, offset value "0" can correspond to overflow list pointer 733 which, in turn, can point to bucket 743. Bucket 743 can hold value identifiers "1" and "2" for colliding values "Thomas" and "Karin", respectively. If hash map 340 maps a new value to index "001" (i.e., a collision occurs between "Thomas", "Karin", and this new value), search structure 330 can determine the insertion point for the corresponding new value identifier by following the chain from offset value "0", to overflow pointer 733, and on to bucket 743. If bucket 743 is not big enough to hold all three value identifiers, search structure 330 can rewrite bucket 743 as described above with respect to FIG. 5A. In doing so, search structure 330 can create a new bucket; insert the new value identifier into this new bucket; move value identifiers "1" and "2" from old bucket 743 into this new bucket; update the pointer value at pointer 733 to point to this new bucket; and delete the old bucket 743.

Offset value "1" can correspond to overflow list pointer 735 which, in turn, can point to bucket 745. Bucket 745 can hold value identifiers "7", "10", and "22" for colliding values "Scott", "Abe", and "Matthew", respectively. If, for example, query operator 216 needs to retrieve a value identifier for "Abe", search structure 330 can begin this retrieval process by entering this value into hash map 340. Hash map 340 can map the value "Abe" to index "002" in bucket list 720. Because index "002" has an offset value of "1", search structure 330 can follow this offset value to pointer 735 in overflow list 730, and on to bucket 745. Because bucket 745 contains multiple value identifiers, search structure 330 can perform a dictionary lookup operation, as described above with respect to FIG. 4, to find the desired value identifier (i.e., "10").

In some implementations, search structure 330 can incorporate special encoding into bucket list 720 to distinguish between indices that store value identifiers and indices that store offset values. This special encoding may be stored as a Boolean value in a reserved bit at each index of bucket list 720, for example. During a retrieval operation, search structure 330 can check this bit value to determine whether it can simply read the desire value identifier directly from the bucket list or whether it needs to follow the offset value to an overflow list and a bucket to retrieve the value identifier.

The implementation of FIG. 7 provides several performance advantages. As described above, reducing the size of bucket list indices reduces the overall consumption of memory resources. There can be a 50% reduction in the total memory footprint if, for example, each index in the bucket list is reduced in size from 8 bytes to 4 bytes. The "extra" memory can be saved or used to double the number of entries in the bucket list. Doubling the number of entries in the bucket list can significantly reduce the chance of collisions and prevent additional memory hops. Moreover, because a value identifier can be stored in each bucket list index, schematic representation 700 can provide direct memory access in some scenarios. In collision situations, however, two memory hops may be required to retrieve value identifiers stored in buckets.

Figure 8:
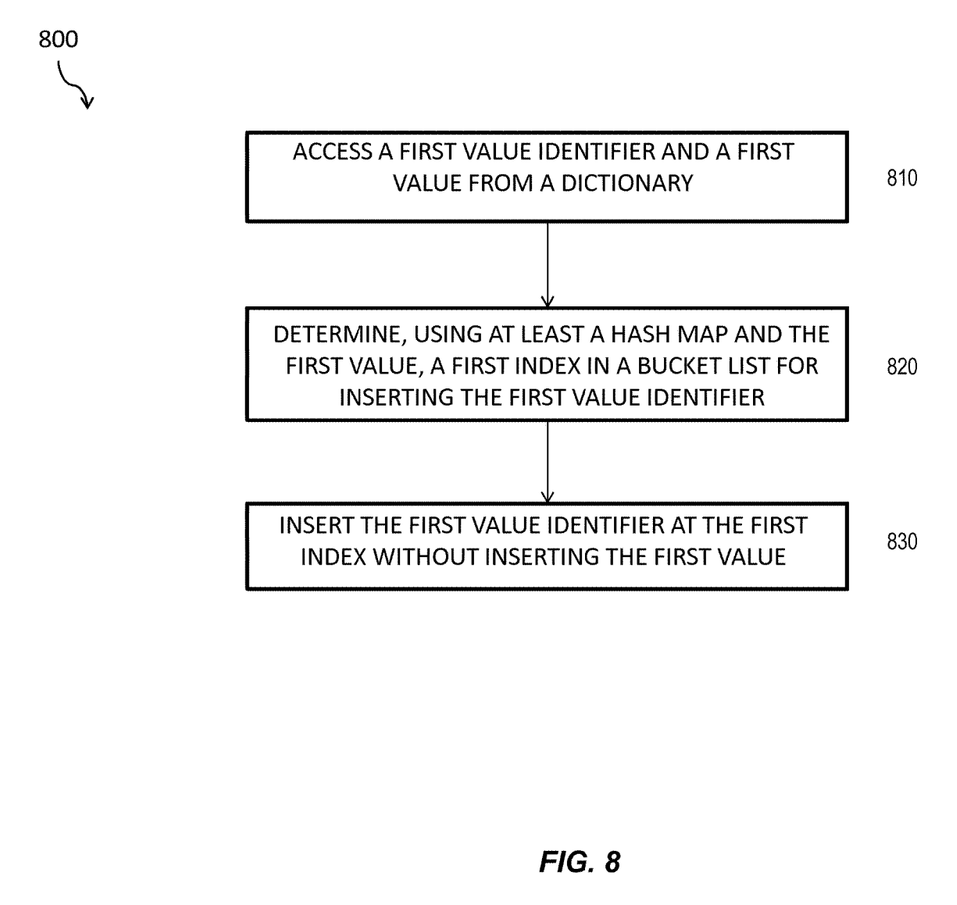
FIG. 8 is a flowchart for inserting a value identifier using a hash map.

FIG. 8 illustrates a flowchart 800 for inserting a value identifier using a hash map. At 810, search structure 330 can access a first value identifier and a first value from a dictionary, such as dictionary 310. Dictionary 310 can store one or more values and one or more value identifiers. The one or more values can include integers, strings, and the like. The one or more value identifiers can represent the position of a corresponding value in the dictionary.

At 820, search structure 330 can determine a first index in a bucket list for inserting the first value identifier. This determination can be made using at least a hash map, such as hash map 340, and the first value. As illustrated in FIG. 4, for example, hash map 340 can map the first value to a particular index (i.e., the first index) in bucket list 420.

At 830, search structure 330 can insert the first value identifier at the first index without storing the first value. Inserting the first value identifier at the first index can provide direct memory access to the first value identifier. If additional value identifiers are later inserted at the first index, search structure 330 can simply insert these additional value identifiers at contiguous memory addresses. Search structure 330 may not need to store the first value in bucket list 420 because the first value can be found in dictionary 310 via a lookup operation.

Figure 9:
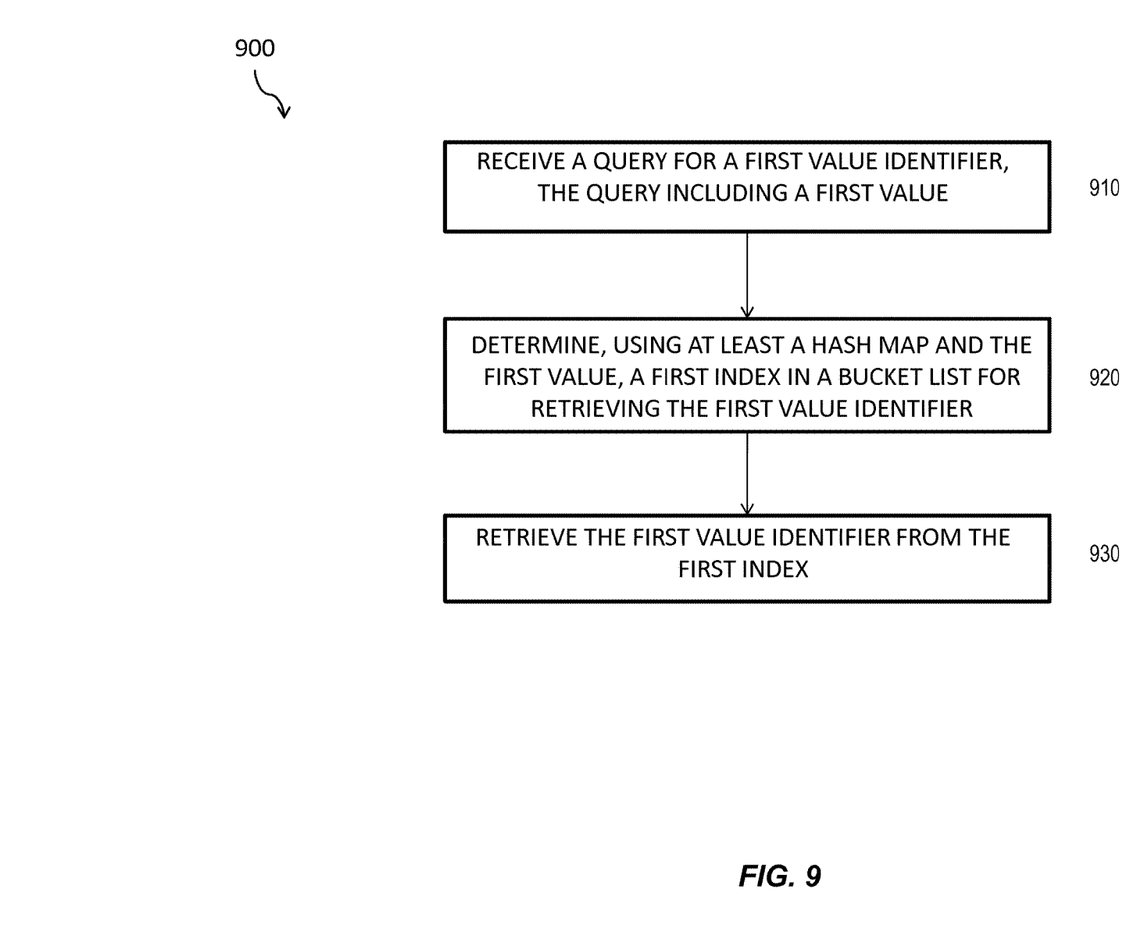
FIG. 9 is a flowchart for retrieving a value identifier using a hash map.

FIG. 9 illustrates a flowchart 900 for retrieving a value identifier using a hash map. At 910, search structure 330 can receive a query for a first value identifier from query operator 216. The query can include a first value that corresponds to the first value identifier. The first value and the first value identifier can be stored in a dictionary having one or more value identifiers and one or more values. The one or more values can include integers, strings, and the like. The one or more value identifiers can represent the position of a corresponding value in the dictionary.

At 920, search structure 330 can determine a first index in a bucket list for retrieving the first value identifier. This determination can be made using at least a hash map, such as hash map 340, and the first value. As illustrated in FIG. 4, for example, hash map 340 can map the first value to a particular index (i.e., the first index) in bucket list 420. Bucket list 420 can store one or more value identifiers at each index without any of their corresponding values.

At 930, search structure 330 can retrieve the first value identifier from the first index.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:

accessing a first value identifier and a first value from a dictionary, the dictionary storing one or more value identifiers and one or more values, the one or more value identifiers and the one or more values representing data managed by a database system, each value identifier corresponding to a different value;

determining, using at least a hash map and the first value, a first index in a bucket list for inserting the first value identifier, the bucket list having one or more indices, each index of the bucket list storing at least one of the one or more value identifiers, the hash map based on a data type of the one or more values and including a vector of one or more pointers, each pointer referring to at least one of the one or more indices of the bucket list; and inserting, based on the determining, the first value identifier at the first index without inserting the first value, the inserting at the first index providing direct memory access to the first value identifier without any intervening memory hops.

2. The method of claim 1, wherein each index stores a maximum of two value identifiers.

3. The method of claim 2, further comprising:
accessing a second value identifier and a second value from the dictionary;
inserting the second value identifier at the first index without the second value when a first collision occurs, wherein the first collision occurs when the hash map maps the first value and the second value to the first index.

4. The method of claim 3, wherein the first value identifier and the second value identifier are inserted at the first index without using a linked list.

5. The method of claim 3 further comprising:
accessing a third value identifier and a third value from the dictionary;
inserting the third value identifier in a bucket without the third value when a second collision occurs;
moving the first value identifier and the second value identifier from the first index in the bucket list to the bucket when the second collision occurs; and
inserting a pointer value in the first index, the pointer value referring to the bucket,
wherein the second collision occurs when the hash map maps the first value, the second value, and the third value to the first index.

6. The method of claim 5, wherein each index of the bucket list further includes encoding representative of whether the index comprises one or more value identifiers or a pointer value.

7. The method of claim 5, wherein the bucket further stores a first size of the first value next to the first value identifier, a second size of the second value next to the second value identifier, and a third size of the third value next to the third value identifier.

8. The method of claim 1, wherein each index stores a maximum of 1 value identifier.

9. The method of claim 8, further comprising:
accessing a second value identifier and a second value from the dictionary;
inserting the second value identifier in a bucket without the second value when a collision occurs;
moving the first value identifier from the first index to the bucket when the collision occurs; and
inserting an offset position in the first index, the offset position associated with a first pointer value in an overflow list having one or more pointer values, the first pointer value referring to the bucket,
wherein the collision occurs when the hash map maps the first value and the second value to the first index.

10. The method of claim 9, wherein each index of the bucket list further includes encoding representative of whether the index comprises a value identifier or an offset value.

11. A system comprising:
at least one processor; and
at least one memory, wherein the at least one processor and the at least one memory are configured to perform operations comprising:
accessing a first value identifier and a first value from a dictionary, the dictionary storing one or more value identifiers and one or more values, the one or more value identifiers and the one or more values representing data managed by a database system, each value identifier corresponding to a different value;
determining, using at least a hash map and the first value, a first index in a bucket list for inserting the first value identifier, the bucket list having one or more indices, each index of the bucket list storing at least one of the one or more value identifiers, the hash map based on a data type of the one or more values and including a vector of one or more pointers, each pointer referring to at least one of the one or more indices of the bucket list; and
inserting, based on the determining, the first value identifier at the first index without inserting the first value, the inserting at the first index providing direct memory access to the first value identifier without any intervening memory hops.

12. The system of claim 11, wherein each index stores a maximum of two value identifiers.

13. The system of claim 12, the operations further comprising:
accessing a second value identifier and a second value from the dictionary;
inserting the second value identifier at the first index without the second value when a first collision occurs, wherein the first collision occurs when the hash map maps the first value and the second value to the first index.

14. The system of claim 13, wherein the first value identifier and the second value identifier are inserted at the first index without using a linked list.

15. The system of claim 13, the operations further comprising:
accessing a third value identifier and a third value from the dictionary;
inserting the third value identifier in a bucket without the third value when a second collision occurs;
moving the first value identifier and the second value identifier from the first index in the bucket list to the bucket when the second collision occurs; and
inserting a pointer value in the first index, the pointer value referring to the bucket,
wherein the second collision occurs when the hash map maps the first value, the second value, and the third value to the first index.

16. The system of claim 11, wherein each index stores a maximum of 1 value identifier.

17. The system of claim 16, the operations further comprising:
accessing a second value identifier and a second value from the dictionary;
inserting the second value identifier in a bucket without the second value when a collision occurs;
moving the first value identifier from the first index to the bucket when the collision occurs; and
inserting an offset position in the first index, the offset position associated with a first pointer value in an overflow list having one or more pointer values, the first pointer value referring to the bucket,
wherein the collision occurs when the hash map maps the first value and the second value to the first index.

18. The system of claim 17, wherein each index of the bucket list further includes encoding representative of whether the index comprises a value identifier or an offset value.

19. A method for implementation by one or more data processors forming part of at least one computing system, the method comprising:
receiving a query for a first value identifier, the query including a first value corresponding to the first value identifier, the first value and the first value identifier stored in a dictionary having one or more value identifiers and one or more values, the one or more value identifiers and the one or more values representing data managed by a database system;

determining, using at least a hash map and the first value, a first index in a bucket list for retrieving the first value identifier, the bucket list having one or more indices, each index of the bucket list storing at least one of the one or more value identifiers without any corresponding value, the hash map based on a data type of the one or more values and including a vector of one or more pointers, each pointer referring to at least one of the one or more indices of the bucket list; and retrieving the first value identifier from the first index.

20. The method of claim 19 further comprising:

performing a lookup operation in the dictionary by at least:
  finding the first identifier value and a corresponding value in the dictionary; and
  comparing the corresponding value to the first value in the query,
wherein the first value identifier is retrieved from the first index when the corresponding value matches the first value.

* * * * *